Examiner
BEST AVAILABLE COPY
March 27, 1928. R. T. WILLIAMS Re. 16,917
EXIT LIGHTING SYSTEM
Original Filed Dec. 3, 1926
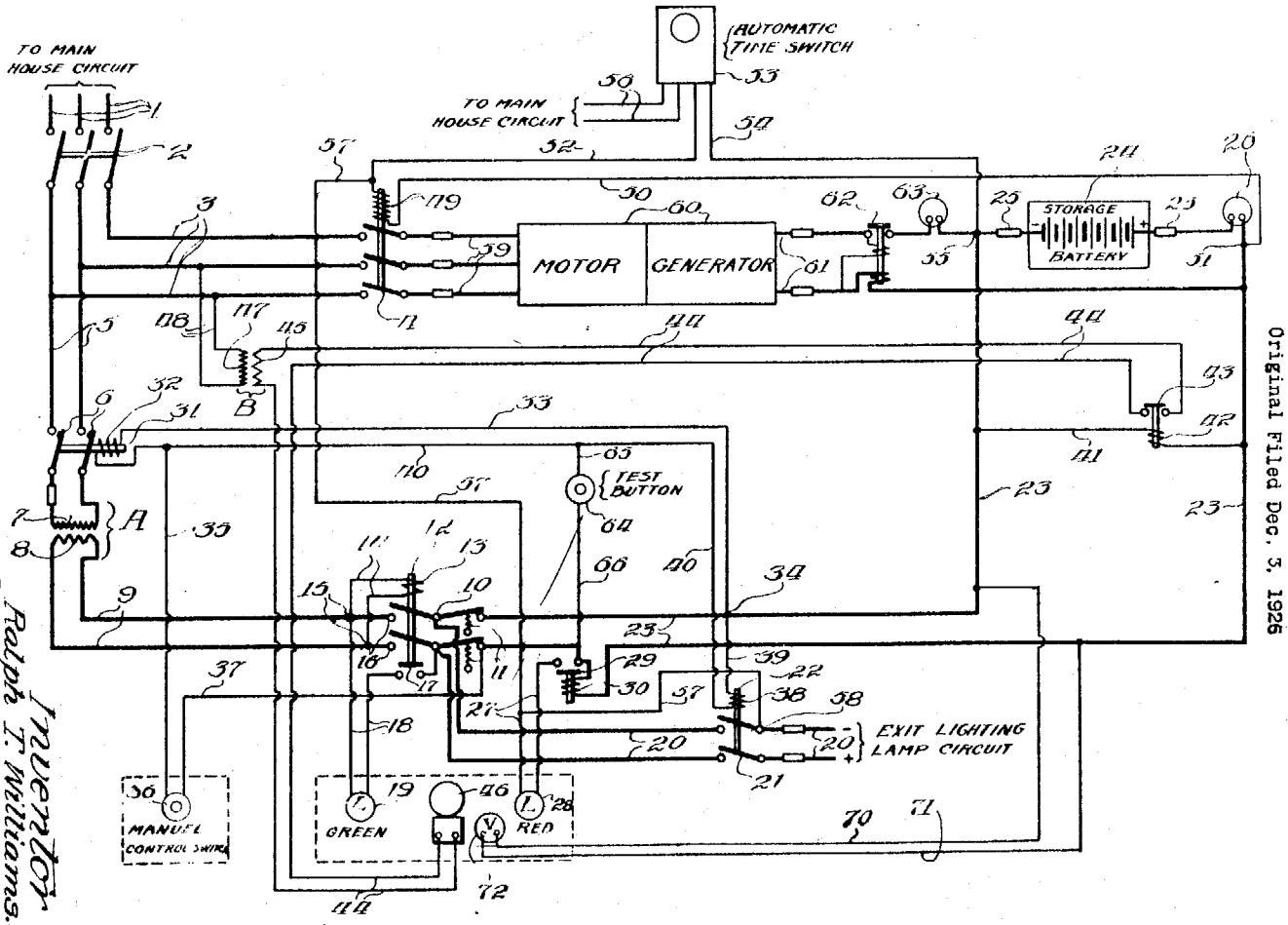
Inventor
Ralph T. Williams.
By Rummler & Rummler
Attys.

Reissued Mar. 27, 1928. Re. 16,917

BEST AVAILABLE COPY

Examiner

UNITED STATES PATENT OFFICE.

RALPH T. WILLIAMS, OF CHICAGO, ILLINOIS, ASSIGNOR TO ROTH BROTHERS & CO., OF CHICAGO, ILLINOIS, A CORPORATION OF ILLINOIS.

EXIT-LIGHTING SYSTEM.

Original No. 1,650,676, dated November 29, 1927, Serial No. 152,443, filed December 3, 1926. Application for reissue filed February 6, 1928. Serial No. 252,370.

This invention relates to an electric lighting system particularly suitable for exit lights of theatres and the like.

The main objects of this invention are to provide an electric lighting system which has a main source of current supply such as the main house circuit and an auxiliary source of current in the form of a storage battery for supplying current to the exit lights when the current from the main house circuit fails; and to provide in a system of this kind, automatic means for controlling and regulating the operation of the various switches in the different circuits.

A diagrammatic illustration of this system is shown in the accompanying drawing.

In the diagram shown in the drawing, a main house circuit 1 is shown provided with a manually operated main line switch 2 having conductors 3 leading to a normally open triple point contact switch 4 and conductors 5 leading to a normally open double point contact switch 6 and thence to the primary winding 7 of a transformer A. The secondary winding 8 of the transformer A is provided with conductors 9 which lead to a double point, double throw switch 10 which is normally held open with respect to the main circuit by suitable means such as coil springs 11. Switch 10 is arranged to be closed on the main circuit 9 by a magnet relay 12, the coil 13 of which is included in a shunt circuit 14 bridged on the main circuit at 15, so that when current is passed over the main circuit, the relay magnet will close the switch 10 at the points 16. A switch 17 is carried by the magnet relay 12 and is arranged to close a signal circuit 18 which includes a lamp 19 for indicating that the switch is closed on the main circuit.

The switch 10 is connected to the exit lighting or lamp circuit 20 which has a normally open switch 21 therein. The closing of the switch 21 is controlled by a magnet relay 22, the circuit of which will be described later.

An auxiliary circuit is also provided for supplying current to the lighting circuit 20 and comprises a pair of conductors 23 which lead to a storage battery 24, preferably of 32 volt, and which is suitably protected by fuses 25. An ammeter 26 with zero center, is included in the auxiliary circuit 23 to show the rate of charge and discharge of the battery 24.

Another signal circuit 27 which includes a lamp 28 is provided for indicating that the auxiliary circuit 23 is supplying current to the lighting circuit and is controlled by a magnet relay switch 29, the coil 30 of which is included in the auxiliary circuit 23. The switch 29 is normally open and is arranged to be closed when current passing through the auxiliary circuit 23 energizes the magnet coil 30.

The normally open main circuit switch 6 is closed by a magnet relay 31, the coil 32 of which is included in a shunt circuit, comprising a conductor 33 attached at 34 to one side of the auxiliary circuit 23 and a conductor 35 leading a manual control switch 36 thence by a conductor 37 to the other side of the auxiliary circuit 23. The normally open lamp circuit switch 21 is adapted to be closed by the magnet relay 22 which is actuated by a coil 38, included in a shunt circuit comprising a conductor 39 attached to one side of the auxiliary circuit 23 at 34, and a conductor 40 which leads to conductor 35 thence through manual control switch 36, and conductor 37 to the other side of auxiliary circuit 23.

Means are provided for indicating when the storage battery 24 fails or has an abnormally low current and comprises a shunt circuit 41 bridged on the auxiliary circuit 23 and which includes a coil 42 for normally holding open a relay switch 43. Insufficient current passing over the circuit 41, permits the switch 43 to close and completes an alarm bell circuit comprising conductors 44 which lead to the secondary winding 45 of a transformer B and to an alarm bell 46. Primary winding 47 of this transformer is provided with conductors 48 for bridging on to the main house circuit.

The triple point switch 4 is normally open and may be closed by a magnet relay, the coil 49 of which is attached to conductor 50 which leads to one side of battery 24 at 51 and to another conductor 52 which leads to an automatic time switch 53 and thence by conductor 54 to the other side of the battery 24 at 55. The operation of the automatic time switch 53 is controlled by current supplied through conductors 56 which are bridged to the main house circuit. The relay

BEST AVAILABLE COPY coil 49 is also controlled by a circuit which leads through a conductor 57 connected to one side of the lamp circuit at 58 so that when the auxiliary circuit 23 is supplying current to the lamp circuit, the coil 49 will be energized and the switch 4 closed. Closing the switch 4 completes the circuit through conductors 59 to a motor-generator set 60 which is adapted to charge the storage battery 24. Conductors 61 leading from the motor-generator set to the battery 24 have included therein a reverse current relay 62 of usual design for opening the circuit and preventing the battery from being drained when the motor-generator set is not running and also includes an ammeter 63 for showing the rate of charge.

The circuits which control the closing of the main circuit switch 6 and the lamp circuit switch 21 can also be closed by a normally open test button 64, bridged onto the circuits by conductors 65 and 66.

In the operation of the system the main line switch 2 is closed. This starts operation of the automatic time switch 53. The manual controlled switch 36, which may be located in a theatre lobby or other suitable place, is then closed and this completes the circuits through the magnet relay switches 6 and 21, allowing current to flow to the primary winding 7 of transformer A, the secondary current passing through conductors 9, shunt circuit 14 and coil winding 13, thereby closing the switch 10 on the main circuit side and thus permitting the current to pass to the lamp circuit 20. The closing of the switch 10 also closes the switch 17 and completes the circuit through the conductors 18 to the signal lamp 19.

Upon failure of the transformer A or upon failure of current to be supplied to the main circuit, the magnet coil 13 will be de-energized and the springs 11 will open the switch on the main current side and close the said switch on the auxiliary circuit 23 thus permitting the auxiliary circuit 23 to supply the current to the lamp circuit 20. The passing of the current through conductors 23 energizes coil 30 closing switch 29 thus completing the circuit through conductors 27 to the signal lamp 28, the signal lamp 19 having gone out when the switch 10 opened from the main circuit side.

The current being supplied from the auxiliary circuit 23 to the lamp circuit 20 also completes the circuit through conductors 57, relay coil 49 and conductor 50 thus closing the switch 4 and if the cause of the failure was in the transformer A, the current from the main house circuit will pass to motor-generator set 60 and cause the generator to float the storage battery 24 as it supplies current to the auxiliary circuit 23. If, by reason of long continued use, the storage battery 24 becomes depleted, the normally open switch 43 will close by reason of de-energizing of the coil 42 of shunt circuit 41. The closing of switch 43 completes the alarm bell circuit 44 and rings the bell 46 if the failure of the main circuit was on account of the transformer A.

The automatic time switch 53 is set to start the motor-generator set 60 through switch 4 at predetermined intervals and keep it running for a definite time, regulated in each case to keep the battery up to charge. For emergency charging, the time switch is provided with a short circuit switch (not shown) by which the motor-generator set may be started and kept running as long as desired.

In some installations, it is desirable to have a visual signal to indicate the state of charge of the storage battery 24, and in such cases a volt meter 72, preferably located on the instrument board, is provided and is bridged to the battery circuit 23 by conductors 70 and 71.

Although but one specific set of controlled circuits has been herein shown and described, it will be understood that numerous modifications may be made without departing from the spirit of this invention as defined by the following claims.

I claim:

1. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current and means operated by current from said auxiliary circuit for closing said main circuit switch and said lamp circuit switch.

2. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current, means operated by current from said auxiliary circuit for closing said main circuit switch and said lamp circuit switch, and a manually operated switch for controlling said switch closing means.

3. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for

BEST AVAILABLE COPY connecting said auxiliary circuit with said lamp circuit upon failure of said main circuit to supply current, means operated by current from said auxiliary circuit for closing said main circuit switch and said lamp circuit switch, a normally open alarm bell circuit and means operated by the failure of said auxiliary circuit to supply current for closing said alarm bell circuit.

4. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current, means operated by current from said auxiliary circuit for closing said main circuit switch and said lamp circuit switch and a signal light circuit arranged to be closed when said main circuit is supplying current to said lamp circuit.

5. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current, means operated by current from said auxiliary circuit for closing said main circuit switch and said lamp circuit switch, and a signal light circuit arranged to be closed when said auxiliary circuit is supplying current to said lamp circuit.

6. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current, means operated by current from said auxiliary circuit for closing said main circuit switch and said lamp circuit switch, a storage battery for supplying current to said auxiliary circuit, a motor-generator set for charging said battery and means operated by current from said storage battery or by current from said main circuit for connecting said motor-generator set to said main circuit.

7. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current, means operated by current from said auxiliary circuit for closing said main circuit switch and said lamp circuit switch, a storage battery for supplying current to said auxiliary circuit, a motor-generator set for charging said storage battery, a normally open motor-generator switch, means operated by current from said battery or by current from said main circuit, for closing said switch, and an automatic time switch for controlling said switch operating means.

8. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current, means operated by current from said auxiliary circuit for closing said main circuit switch and said lamp circuit switch, a motor-generator set for supplying current to said auxiliary circuit and means controlled by a current from said auxiliary circuit for operating said motor-generator set.

9. In an electric lighting system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current, means operated by current from said auxiliary circuit for closing said main circuit switch and said lamp circuit switch, a motor-generator set for supplying current to said auxiliary circuit and means effective when said auxiliary circuit is supplying current to said lighting circuit for operating said motor-generator set.

Signed at Chicago, this 2nd day of February, 1928.

RALPH T. WILLIAMS.